United States Patent [19]

Alferes

[11] 4,088,436
[45] May 9, 1978

[54] GAS DISTRIBUTION SYSTEM

[75] Inventor: Ernest Alferes, Honolulu, Hi.

[73] Assignee: The Hansen Manufacturing Company, Cleveland, Ohio

[21] Appl. No.: 666,016

[22] Filed: Mar. 11, 1976

[51] Int. Cl.² .............................................. F23H 5/02
[52] U.S. Cl. ........................................ 431/21; 431/22; 431/278; 431/346; 137/517; 137/74
[58] Field of Search ..................... 431/21, 22, 89, 278, 431/346, 344; 126/38; 137/517

[56] References Cited

U.S. PATENT DOCUMENTS

| 2,810,631 | 10/1957 | Kanenbley | 431/346 |
| 2,823,048 | 2/1958 | Hansen | 251/149.6 |
| 3,140,740 | 7/1964 | Lagreid et al. | 431/110 |
| 3,245,423 | 4/1966 | Hansen et al. | 137/74 |
| 3,263,699 | 8/1966 | Givler et al. | 137/517 |
| 3,734,115 | 5/1973 | McMath | 137/517 |

FOREIGN PATENT DOCUMENTS

| 537,510 | 2/1957 | Canada. | |
| 596,093 | 6/1959 | Italy | 431/21 |

Primary Examiner—Carroll B. Dority, Jr.

[57] ABSTRACT

In combination with a plurality of gas burning appliances and a gas source therefor, a gas distribution system having a main feed line connected at one end thereof to the gas source, a manifold feed means having a single inlet connected to another end of said main feed line and having a plurality of outlets, and a plurality of individual flexible feed lines each connected at one end thereof to each of the plurality of outlets of the manifold feed means, and connected at another end thereof to each inlet of the plurality of gas burning appliances. The individual feed lines are connected with at least one of the said burning appliances or the manifold means with a shutoff, quick disconnect coupling, which may have a fusible safety cutoff means including an element which responds to excessive heat to effect closing of a valve in said quick disconnect coupling to thereby block propagation of a flame wave through the coupling. The main feed line may have a combined automatic shutoff and flame arrester for connecting said one end thereof to the gas source and a gas regulator for reducing gas pressure of the gas source to a pressure suitable for said gas appliances, the shutoff of the combined shutoff and flame arrester having a flexible seat for a closing member thereof to automatically effect gas flow shutoff in the event of undesirable increased gas flow.

3 Claims, 4 Drawing Figures

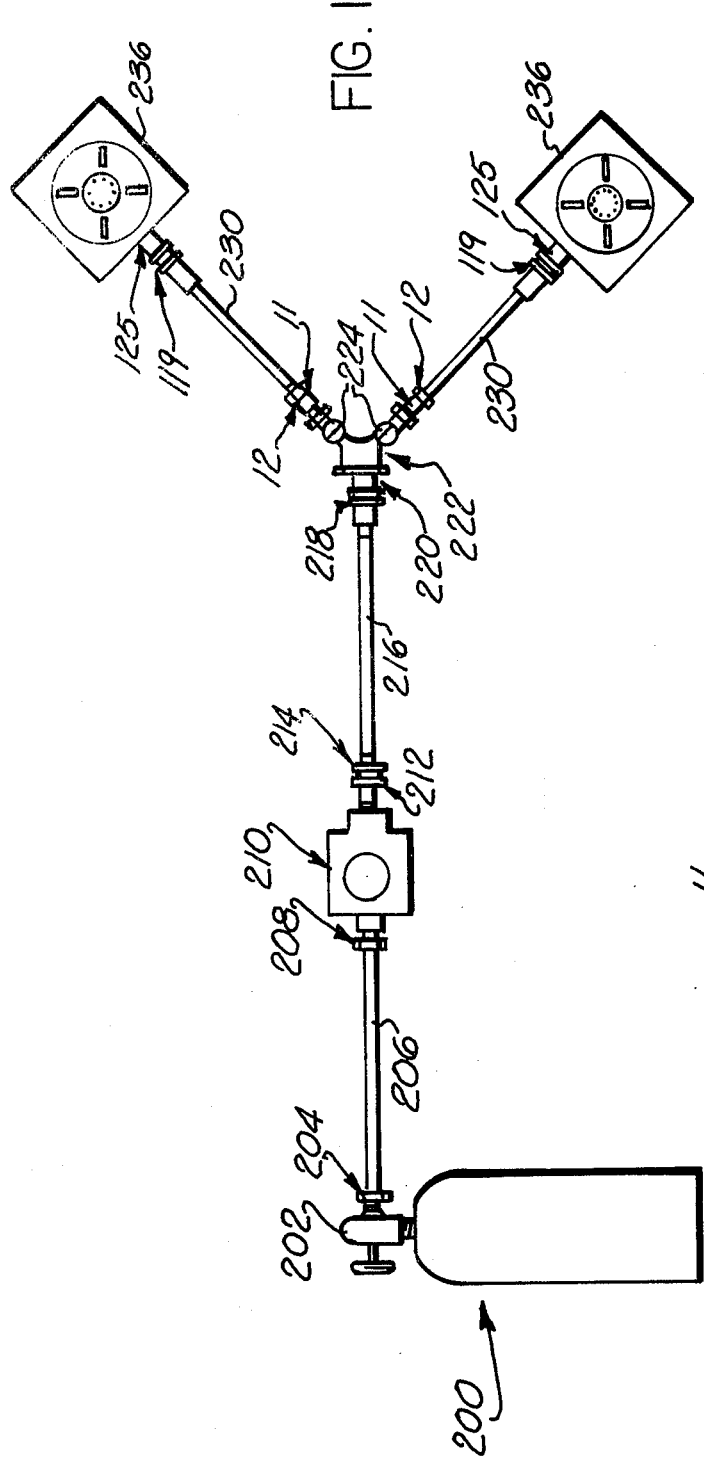
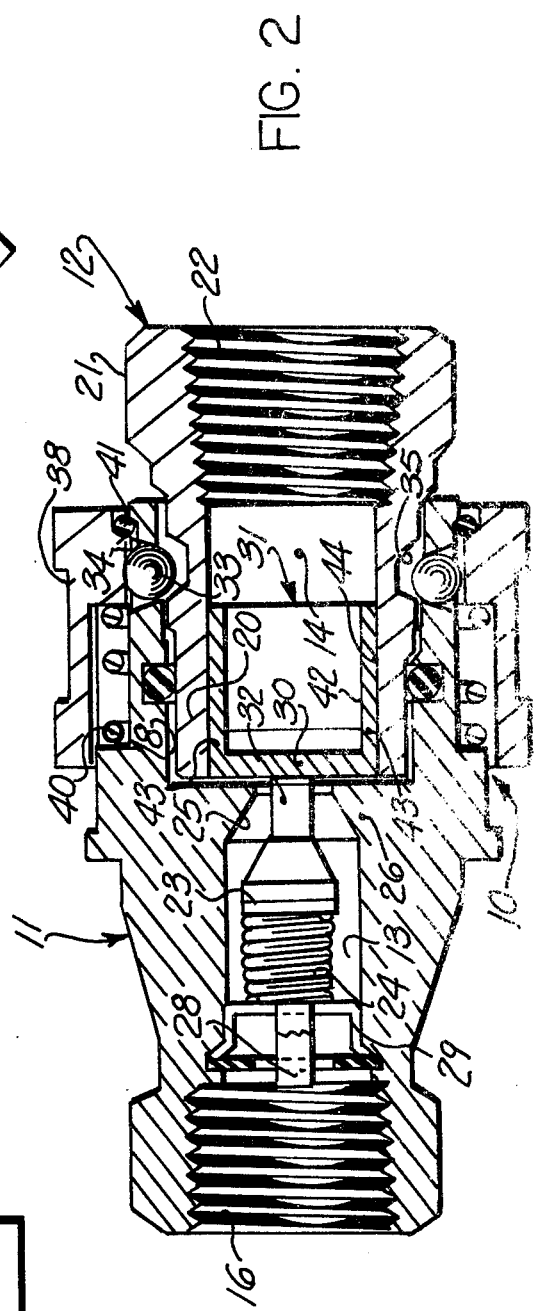

GAS DISTRIBUTION SYSTEM

The present invention relates to a gas distribution system for distributing gas from a common source to multiple gas burning appliances, such as stoves, using quick disconnect couplings and flexible hose.

An object of the present invention is to provide a simplified, yet safe, gas distribution system for multiple gas burning appliances, such as stoves used in open flame cooking in restaurants, from a common source wherein an automatic shutoff device precludes gas escape in case of failure and wherein quick disconnect couplings are used to provide easy installation and mobility.

Further objects and advantages of the present invention will be apparent from the following detailed description made with reference to the accompanying drawings forming a part of the present specification and in which:

FIG. 1 is a schematic view employing the present invention;

FIG. 2 is a cross-sectional view of a quick disconnect coupling used in the present invention;

Figure 3:
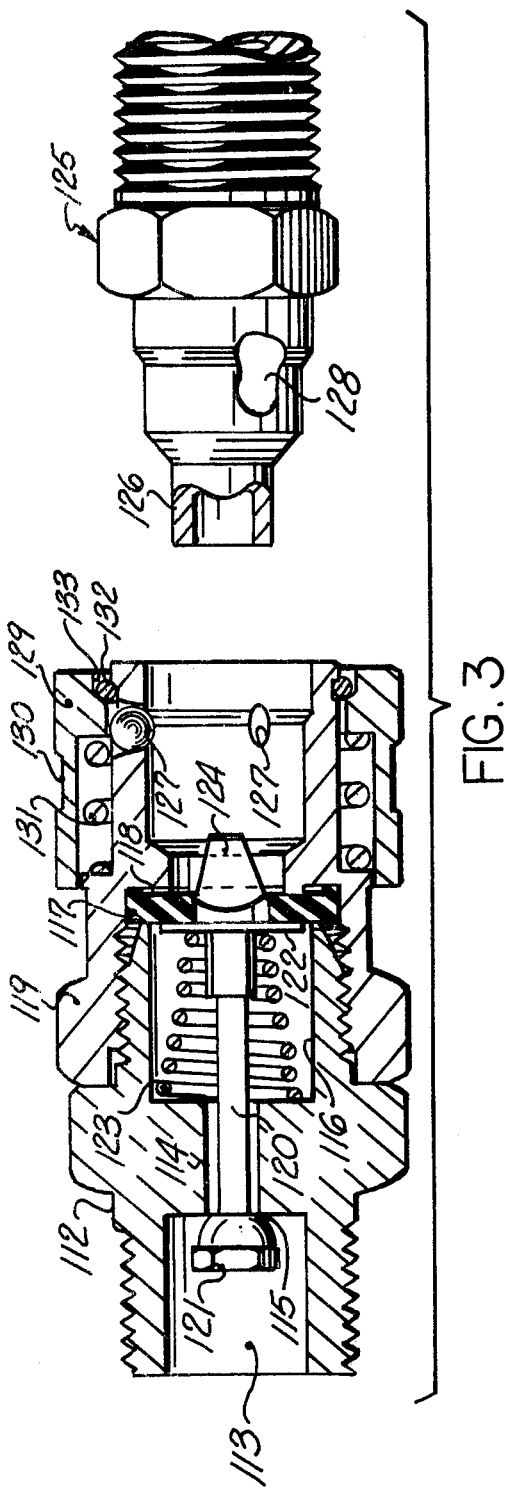
FIG. 3 is an elevational view, partly in central longitudinal section of a combined service valve and valved coupling used in the present invention, the coupling being disconnected.

As used in this specification and accompanying claims, the term "gas" is meant to encompass only fuel in the vapor state capable of flowing under pressure, such as natural gas, manufactured gas, mixed gas, L.P.G., L.N.G., and L.P.G. — air mixtures, etc. The term "plurality" is meant to include two or more items.

The schematic view of FIG. 1 shows the gas distribution system of the present invention for supplying gas from a single gas source 200 upstream to a plurality of stoves 236. Valve 202 controlling gas source 200 is connected to a combined shutoff flow sensor and flame arrester 204, which is described in more detail in connection with FIG. 4. Shutoff and flame arrester 204 is suitably connected to flexible hose 206, which in turn is connected to coupling means 208. A conventional gas pressure regulator 210 is connected to coupling means 208 for reducing the pressure of the gas from gas source 200 to a suitable level for the gas stoves 236. The upstream side of the regulator 210 is provided with a coupling socket 212, which mates with a corresponding plug 214 connected to flexible hose 216. Flexible hose 216 is connected upstream to on — off Y-valve 222 by coupling socket 218 and coupling plug 220. Flexible hoses 216 and 206 together with their accompanying couplings and fittings comprise the main feed line from gas source 200 to on — off Y valve 222.

On — off Y-valve 222 can be any suitable manifold with a shutoff valve 224 for each outlet to be connected to gas stove 236. More than two outlets can be provided from the main feed line to the gas stoves 236 by any on — off valve arrangement equivalent to Y-valve 222, since Y-valve 222 is a manifold feed type arrangement for feeding gas from the main feed line to a plurality of gas outlets.

The on — off Y-valve 222 is connected to each stove 236 by an individual feed line which comprises a quick connect coupling socket 11 connected to the Y-valve 222, a mating coupling plug 12 connected to flexible hose 230, a quick connect coupling socket 119 connected to the upstream end of flexible hose 230, and a suitable mating coupling plug 125 to provide a connection to the corresponding gas stove 236.

Coupling plug 12 and socket 11 together comprise a one-way shutoff, quick disconnect coupling with a fusible safety cut-off means as more clearly described with reference to FIG. 2. Coupling plug 125 and socket 119 together comprise a one-way shutoff, quick disconnect coupling as more clearly described with reference to FIG. 3. Similarly, coupling plugs 220, 214 and sockets 218, 212 together may comprise the couplings shown in FIG. 3; or, alternatively, conventional piping may be used from hose 206 to the on — off Y-valve 222, with the above and hereinafter described quick disconnect couplings used upstream of the Y-valve 222.

Stove 236 is provided with lighting means at the junction of coupling plug 125 and stove 236 so that the stove may be ignited in conjunction therewith and the valve 224 on the on — off Y-valve 222.

In another modification to the system illustrated in FIG. 1, flexible hose 206 and coupling means 208 can be eliminated depending on space requirements; instead, automatic shutoff and flame arrester 204 is secured directly to regulator 210.

Referring to the one-way shutoff, quick disconnect coupling with fusible safety cutoff means of FIG. 2, a coupling 10 is shown having a socket part 11 and a plug part 12 which is received in the socket part 11. The socket part 11 has an axially extending passageway 13 therethrough which registers with an axially extending passageway 14 in the plug part 12 to form a fluid passage through the coupling 10.

At one end of the socket part 11, the internal wall of the passageway 13 is threaded, as indicated by the reference numeral 16, to provide a means for connecting the socket part to a pipe or other line, while at the other, or socket, end of the socket part 12, the passageway 13 is enlarged to provide an enlarged opening 18 for receiving a nose portion 20 formed on one end of the plug member 12. The other end portion, designated by the reference numeral 21, of the plug member 12 is threaded internally as indicated at 22, to provide means for connecting the plug member to a flexible line or the like and the outside configuration of the end portion 21 is hexagonal.

The socket part 11 is provided with a self-closing valve 23 which is diposed in the passageway 13 intermediate the threaded portion 16 and the enlarged opening 18 and is biased by a spring 24 to move toward the enlarged portion 18 and into engagement with a tapered seat 25 formed on a radially, inwardly extending shoulder 26 adjacent the inner end of the enlarged portion 18 of the passageway 13.

The valve 23 has an axially extending valve stem 28 which is slidably received in an opening in a spider 29 supported in the passageway 13. The spring 24 is disposed about the valve stem 28 and abuts the spider 29 and the head of the valve 23 and urges the valve away from the spider into engagement with the valve seat. The valve stem sliding in the spider guides the movement of the valve 23.

As the plug part 12 is inserted into the enlarged opening 18 of the passageway 13, a bridge 30 on a nose member 31 disposed in the passageway 14 of the plug part engages a projecting portion 32 extending from the valve 23 outwardly into the enlarged portion 18 and, as the plug part 12 is moved into the opening, the valve 23 is opened. When the plug part 12 has been fully inserted into the opening, as is shown in FIG. 2, the plug is locked in assembled relationship by a plurality of ball detents 33 disposed in individual openings in the wall of the enlarged opening 18 of the passageway 13. The balls 33 arranged in a circle about the passageway are adapted to project into the enlarged opening 18 in which the plug part 12 is received and the plug part 12 has an annular groove 35 therein adapted to receive the balls and cooperates therewith to lock the parts together when the balls are prevented from moving outwardly of their openings 34.

A locking sleeve 38 is disposed about the socket end of the socket part 11 and is slidable to a position where the balls 33 are locked in their position where they extend into the enlarged opening 18 and to a position displaced toward the other end of the socket part where the balls are free to move outwardly of their openings to release the plug part 12. The locking sleeve 38 is biased to a locking position by a spring 40 and is limited in its movement by the spring to its locking position by a snap ring 41 which forms a stop for the sleeve.

The locking sleeve and ball detent means have not been described in detail since the construction and operation of such locking sleeves and ball detents are well known to those skilled in the art. Moveover, the self-closing valve has not been described in considerable detail since this valve is also known in the art and is similar to that shown in U.S. Pat. No. 2,823,048; of course, in operation the self-closing valve allows plug 12 and flexible hose 230 to be disconnected for repairs or movement of the system by sealing valve 23 in seat 25 under the bias from spring 24, keeping the remaining lines in the system at full operational pressure by preventing any gas from escaping so that operation of the other stoves 236 is unaffected.

The nose member 31 comprises, in addition to the bridge 30, a cylindrical sleeve portion 42 having diametrically opposed, axially projecting tabs 43 at one end which are integrally connected to the opposite ends of the bridge 30 to interconnect the bridge and sleeve portion 42. The bridge 30 extends diametrically across the cylindrical sleeve 42 and has a width which is less than the diameter of the sleeve 42 so that gas can flow between opposite sides of the bridge and the sleeve. This flow of gas is promoted by the tabs 43 which space the bridge axially outwardly from the sleeve.

The nose member 31 is slightly smaller in diameter than the passageway 14 and is fixed in position in the passageway 14 by a band of solder 44 which extends around the sleeve portion of the nose member and is preferably coextensive with the axial extent of the sleeve portion. In any case, the band of solder 44 has an axial extent which is substantial as distinguished from a line or a narrow ring of solder.

The nose member 31 may be soldered in the passageway 14 by applying solder, for example, a ring of solder in wire form around one end of the sleeve after it is disposed in the passageway. The solder when fused will work its way by capillary action along the space between the cylindrical external circumference of the sleeve portion 42 and the cylindrical inner surface of the nose portion 20. This solder will form a band which interconnects the sleeve portion and the wall of the passageway 14.

It will be appreciated that the band of solder forms a connection between the sleeve 42 and the wall of the passageway 14 which is strong in shear and will take the biasing forces applied by the valve 23, tending to move the nose member along the passageway. The solder, however, will fuse when the temperature in the area reaches a predetermined level and allow the nose member to move in the passageway 14 under the action of the bias on the valve and thereby allow the valve 23 to close, even though the parts 11 and 12 remain in connected relationship. In this manner, the closed valve 23 will prevent propagation of a flame wave beyond socket 11 in the event of a malfunctioning in the gas appliance connected thereto.

The passageway 14 is cylindrical inwardly of the nose member 31 and the nose member 31 is free to move the necessary distance to allow the valve 23 to close, once the solder connecting the nose member and the wall of the passageway 14 has melted upon heating of the plug 12. The sleeve portion 42 closely conforms to the configuration of passageway 14 and the nose member 31 will be guided axially in the passageway when it moves after the solder has fused with little or no tendency to cock or jam. The sleeve portion 42 forms a guide which constrains the nose member to move axially in the passageway 14 and constrains the member against tipping or cocking once the soldered connection holding the nose member against movement has fused. Consequently, the sleeve portion forms both a guide part and a part for connecting the nose member 31 to the plug part 12.

With reference to the one-way shutoff, quick disconnect coupling of FIG. 3, valve housing 112 is shown having a rear cavity 113 which communicates with a central lengthwise passage 114. A valve seat 115 is formed at the rear end of this passage. At its forward end passage 114 communicates with a forward cavity 116. The wall of the forward end of the housing is inwardly tapered so as to engage an annular gasket 117 radially inward from the raised rim of the gasket, and thus to better grip the gasket against a wall 118 on the female member 119 of a valved coupling.

A valve stem 120 within the housing and extending through passage 114 has a valve piece 121 at its rear end, which may be hemispherical in shape and is adapted to engage valve seat 115. Near its forward end the stem has fixed thereupon a disk valve piece 122 which is normally held in sealing engagement with gasket 117 through the force exerted by a coil spring 123 bearing at its rear end against an intermediate wall of the housing and at its front end against valve piece 122. The forward end of the stem has a head 124 which extends through the opening in gasket 117 and has tapered edges in one plane and is flatted in a plane at right angles thereto.

The plug member 125 of the coupling has a tubular nose 126 with a rounded edge. When the member 125 is inserted into the member 119 the nose 126 engages the head 124 of the stem 120 and forces it backwardly to unseat disk valve piece 122 from gasket 117 and moving valve piece 121 backwardly in a direction away from its seat. At the same time the rounded edge of nose 126 engages the gasket 117, deflects it slightly and effects a seal which prevents loss of pressure fluid outwardly through the joint between the two members of the coupling. Thus when it is desired to disconnect flexible hose 230 from gas stove 236 for repairs or movement of the system, valve piece 122 will seal against gasket 117 when member 125 is removed from member 119 preventing any gas from escaping member 119 and flexible hose 230 and keeping the remaining lines in the system at full operational pressure. In this manner operation of the other gas stoves is unaffected.

A simplified form of the quick disconnect valve shown in FIG. 3 may be used whereby valve piece 121 and valve stem 120 are eliminated. In this simplified form, head 124 is secured to valve piece 122 which in turn is secured directly to coil spring 123; head 124 can also be modified to completely seal against gasket 117 — an inverted stepped-cone shape being preferred.

A conventional means for locking the two members of the coupling together in operative relation and for releasing the locking means may be employed. For example, the plug member 125 may have three or more recesses 128 formed in its sides that are adapted to be engaged by steel balls 127 which are disposed in inwardly tapered openings through the socket member 119. In the operative position these balls are held against movement out of the recesses 128 by an internal annular projection 129 on a sleeve 130 which is maintained in the illustrated position by a coil spring 131, a snap ring 132 serving as a stop. When it is desired to disconnect the coupling the sleeve 130 is drawn to the left until an annular cavity 133 in the sleeve comes into radial alignment with balls 128, permitting the latter to be cammed outwardly to the degree necessary to release the plug member. With regard to FIG. 3, further reference is directed to Canadian Pat. No. 537,510.

Figure 4:
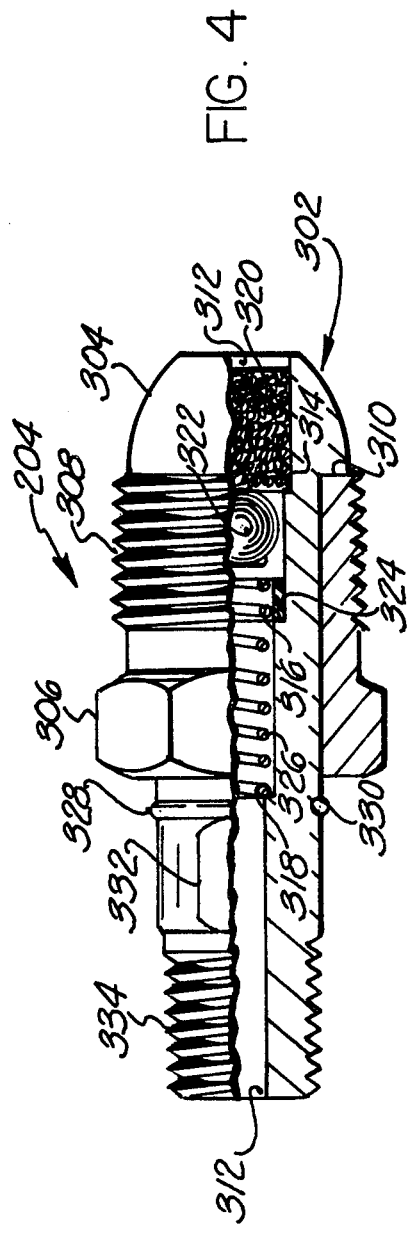
FIG. 4 is an elevational view, partly in lower longitudinal section of a combined cylinder connection valve and flame arrester used in the present invention.

FIG. 4 shows the combined cylinder connection valve and flame arrester 204 used to connect the main feed line 206 and 216 to the gas source 200. The main feed line is sealed to the gas source by arcuately-shaped, frusto-conical projection 304 on connection nipple 302 which mates a corresponding recess in valve 202, schematically shown in FIG. 1 as part of a tank of compressed gas. Connection nipple 302 and projection 304 are secured to the gas source by nut 306 bearing against flange 310 of projection 304 and having a threaded portion 308 for engagement to the valve 202. Of course, if conventional pressurized gas cylinders are used as the gas source 200, the threaded portion 308 will have to conform to the left-handed threads commonly used. Within connection nipple 302 is a passage 312 having a series of concentric, telescoping annular steps 314, 316 and 318, in decreasing diameter in the direction of the gas flow. Contained within passage 312 at the projection end 304 is flame arrester 320 which is a porous bronze plug having openings on the order of 40–60 microns. Flame arrester 320 prevents any flame which may have accidently started in the main feed line from reaching the gas source. Also contained within passage 312 immediately behind flame arrester 320 is an automatic shutoff flow sensor which blocks the flow of gas in case of a ruptured line or fitting. The shutoff automatically operates when the flow of gas through passage 312 exceeds the rated flow rate. In the embodiment illustrated in FIG. 4, the shutoff comprises ball closing member 322 which is engaged between flame arrester 320, which is blocked from further travel along passage 312 by step 314, and valve spring 326, which is seated at its other end in step 318. Upstream of the ball 322 is valve seat 324 which is set in step 316 and which is advantageously composed of nylon, Teflon or other suitable plastics.

In operation, the free length and strength of valve spring 326 is selected to achieve the desired maximum flow rate. Above that flow rate, providing a margin of safety if desired, the pressure differential across the ball 322 will force ball 322 against the valve spring 326 until it seals against valve seat 324, shutting off all flow automatically. When the pressure differential across the ball 322 is subsequently reduced, the force of spring 326 forces ball 322 away from the seat 324 to allow resumption of the gas flow. Therefore, if any of the lines 206, 216, or 230 should be accidently broken or inadvertently disconnected during operation of the stoves 236, the resulting loss in pressure in the gas lines and increase in the pressure differential across the ball 322 will move it into sealing engagement with the seat 324. Once the break has been repaired or the line reconnected, the pressure differential across the ball 322 is reduced and the ball moves away from the seat 324.

Lock ring 328 is maintained in recess 330 in the connection nipple body 302 in order to prevent removal of nut 306 from nipple body 302 when the combined valve and flame arrester 204 is removed from gas source 200.

Immediately upstream of lock ring 328, the nipple body 302 is provided with wrench flats 332 and a suitable connection means, such as male pipe threads 334. Alternatively, the connection means could be female pipe threads, hose stem connections, or compression type hose clamp connections.

Nut 306, lock ring 328, ball 322, spring 326, and nipple body 302 can be formed of any suitable material, but generally bronze, brass and stainless steels are preferred, as is well known in the art.

Although the connection means for the quick disconnect couplings shown in FIGS. 2 and 3 are pipe threads, the socket and plug ends of the couplings may be provided with any desired or suitable combination of male pipe threads, female pipe threads, hose stem connections, or compression type hose clamp connections. Similarly, the orientation of the socket and plug ends of the couplings is not critical and is determined by the fittings on the gas appliance, Y-valve, regulator, and hoses.

For the purposes of illustration of the present invention, gas stoves 236 have been shown, but it will be recognized that any suitable gas appliance can be used in conjunction with the present invention. Also, by reference to flexible hoses it is intended to include hoses composed of polymeric materials.

I claim:

1. An apparatus for use in association with a source of gas under pressure and a plurality of gas burning appliances, said apparatus comprising a main feed line having one end adapted to be connected with the source of gas, a manifold connected with another end of said main feed line to enable gas to flow from the source of gas through said main feed line to said manifold, a plurality of secondary feed lines, a first plurality of quick disconnect coupling assemblies for connecting first end portions of each said secondary feed lines in fluid communication with said manifold, each coupling assembly of said first plurality of coupling assemblies including a socket assembly connected with said manifold and a plug connected with a first end portion of one said secondary feed lines, each of said socket assemblies including a socket housing which at least partially defines a socket chamber connected in fluid communication with said manifold and adapted to telescopically receive a plug, a socket valve member disposed in said socket housing and movable between an open position enabling gas to flow from said manifold through said socket chamber and a closed position blocking a flow of gas from the manifold through the socket chamber, a socket valve spring for urging the socket valve member toward the closed position, and a plurality of selectively releasable locking elements for holding a plug in the socket chamber, each of said plugs including a leading end portion for effecting movement of a socket valve member from the closed position to the open position against the influence of a socket valve spring to enable gas to flow from the manifold to the secondary feed line connected with the plug upon insertion of the plug into a socket chamber, said apparatus further including a second plurality of quick disconnect coupling assemblies for connecting second end portions of each of said secondary feed lines in fluid communication with an associated one of the gas burning appliances, each coupling assembly of said second plurality of coupling assemblies including a socket assembly connected with the second end portion of one of said secondary feed lines and a plug connected with the associated one of the gas burning appliances, each socket assembly of said second plurality of socket assemblies including a socket housing which at least partially defines a socket chamber connected in fluid communication with the second end portion of one of said secondary feed lines and adapted to telescopically receive a plug connected with one of the gas burning appliances, a socket valve member disposed in said socket housing and movable between an open position enabling gas to flow from one of the secondary feed lines through said socket chamber and a closed position blocking a flow of gas from the one secondary feed line, a socket valve spring for urging the valve member toward the closed position in the socket housing of one of the socket assemblies of the second plurality of coupling assemblies, and a plurality of selectively releasable locking elements for holding a plug connected with one of the gas burning appliances in the socket chamber, each of the plugs of the second plurality of coupling assemblies including a leading end portion for effecting movement a socket valve member from the closed position to the open position against the influence of a socket valve spring to enable gas to flow from a secondary feed line to the gas burning appliance connected with the plug into a socket chamber of a socket assembly of the second plurality of coupling assemblies, said apparatus further including a plurality fusible safety cutoff means connected with the plugs of one of said pluralities of coupling assemblies for effecting a closing of the socket valves associated with the plugs when the associated coupling assembly is exposed to excessive heat to hereby retard propagation of a flame wave through said one of said pluralities of coupling assemblies in the event of a malfunctioning of a gas burning appliance, and means connected with one of said feed lines for retarding flame propagation and limiting the flow of gas through said one of said feed lines, said means for retarding flame propagation and limiting gas flow including a casing through which gas supplied to said one of said feed lines flows, a body of porous material having a plurality of openings therein for retarding the passage of flame through the body of porous material, a valve element movable in the direction of flow of gas through said casing from an open condition in which said valve element is ineffective to block the flow of gas through said casing to a closed condition in which said valve element is effective to block the flow of gas through said casing, and valve element spring means for urging said valve element toward the open condition, said valve element being movable from the open condition to the closed condition against the influence of said valve element spring means under the influence of a predetermined flow rate of gas through said casing.

2. An apparatus as set forth in claim 1 wherein said valve element spring means is effective to press said valve element against said body of porous material when said valve element is in the open condition.

3. An apparatus as set forth in claim 1 wherein said means for retarding flame propagation and limiting gas flow includes a flexible annular valve seat disposed in said casing for sealingly engaging said valve element when said valve element is in the closed condition.

* * * * *